US011575857B2

(12) United States Patent
Lee et al.

(10) Patent No.: US 11,575,857 B2
(45) Date of Patent: Feb. 7, 2023

(54) WIRELESS POWER TRANSMISSION OF ELECTRONIC DEVICE HAVING ROTATING BODY

(71) Applicant: HANWHA TECHWIN CO., LTD., Seongnam-si (KR)

(72) Inventors: Youngchan Lee, Seongnam-si (KR); Brian Sung, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 344 days.

(21) Appl. No.: 16/767,161

(22) PCT Filed: Dec. 6, 2018

(86) PCT No.: PCT/IB2018/059723
§ 371 (c)(1),
(2) Date: May 27, 2020

(87) PCT Pub. No.: WO2019/111206
PCT Pub. Date: Jun. 13, 2019

(65) Prior Publication Data
US 2020/0389061 A1 Dec. 10, 2020

(30) Foreign Application Priority Data
Dec. 6, 2017 (KR) .................. 10-2017-0167081

(51) Int. Cl.
*H04N 7/18* (2006.01)
*H04B 17/318* (2015.01)
(Continued)

(52) U.S. Cl.
CPC ............ *H04N 7/185* (2013.01); *H02J 50/80* (2016.02); *H02J 50/90* (2016.02); *H04B 17/318* (2015.01);
(Continued)

(58) Field of Classification Search
USPC ...................................................... 348/143
See application file for complete search history.

(56) References Cited

U.S. PATENT DOCUMENTS 7,307,820 B2 * 12/2007 Henson ............... H02H 1/0015
324/536
2007/0208520 A1 * 9/2007 Zhang .................. H02H 3/335
702/108
(Continued)

FOREIGN PATENT DOCUMENTS

| JP | 2015/223423 A | 12/2015 |
| KR | 10-2012-0009929 A | 2/2012 |
| WO | 2017/015519 A1 | 1/2017 |

OTHER PUBLICATIONS

International Search Report of PCT/IB2018/059723 dated Apr. 25, 2019.
(Continued)

*Primary Examiner* — Nigar Chowdhury
(74) *Attorney, Agent, or Firm* — McLean IP Global; Jason Y. Pahng

(57) ABSTRACT

The present document discloses a camera device comprising a camera sensor, a wireless communication unit configured to receive a wireless communication signal from an external device, a rotating body configured to be rotated together with the camera sensor and the wireless communication unit, a rotation driving unit configured to rotate the rotating body, a wireless power transmitter configured to transfer wireless powers to the external device, and a control unit configured to rotate the rotating body in a panning direction by the rotation driving unit, estimate direction information of the external device at least partially based on a change of a received signal strength of a wireless communication signal caused by the rotation of the rotating body, determine a transmission direction of a wireless power signal for the (Continued)

external device based on the direction information of the external device, and transmit the wireless power signal in the transmission direction.

12 Claims, 10 Drawing Sheets

(51) Int. Cl.
*H02J 50/80* (2016.01)
*H02J 50/90* (2016.01)
*H04N 5/232* (2006.01)
*H04W 52/18* (2009.01)
*H02J 50/12* (2016.01)
*H02J 50/40* (2016.01)
*H02J 50/10* (2016.01)
*H02J 7/00* (2006.01)

(52) U.S. Cl.
CPC ..... *H04N 5/23241* (2013.01); *H04N 5/23299* (2018.08); *H04W 52/18* (2013.01); *H02J 7/0013* (2013.01); *H02J 50/10* (2016.02); *H02J 50/12* (2016.02); *H02J 50/402* (2020.01)

(56) References Cited

U.S. PATENT DOCUMENTS

| | | |
|---|---|---|
| 2008/0014897 A1 | 1/2008 | Cook |
| 2012/0235499 A1 | 9/2012 | Liu |
| 2014/0091755 A1 | 4/2014 | Walley |
| 2016/0044385 A1* | 2/2016 | Kareeson ............ G06Q 20/3224 725/27 |
| 2016/0261915 A1* | 9/2016 | Niebres .............. H04N 21/4318 |
| 2016/0300266 A1* | 10/2016 | Smalley ............. G06Q 30/0267 |
| 2016/0359376 A1 | 12/2016 | Zeine et al. |
| 2017/0110904 A1 | 4/2017 | Liu et al. |
| 2017/0271927 A1 | 9/2017 | Sakata et al. |
| 2019/0208281 A1* | 7/2019 | Niebres .............. H04N 21/8547 |

OTHER PUBLICATIONS

International Preliminary Report on Patentability of PCT/IB2018/059723 dated Jun. 9, 2020.

* cited by examiner

[Fig. 8B]
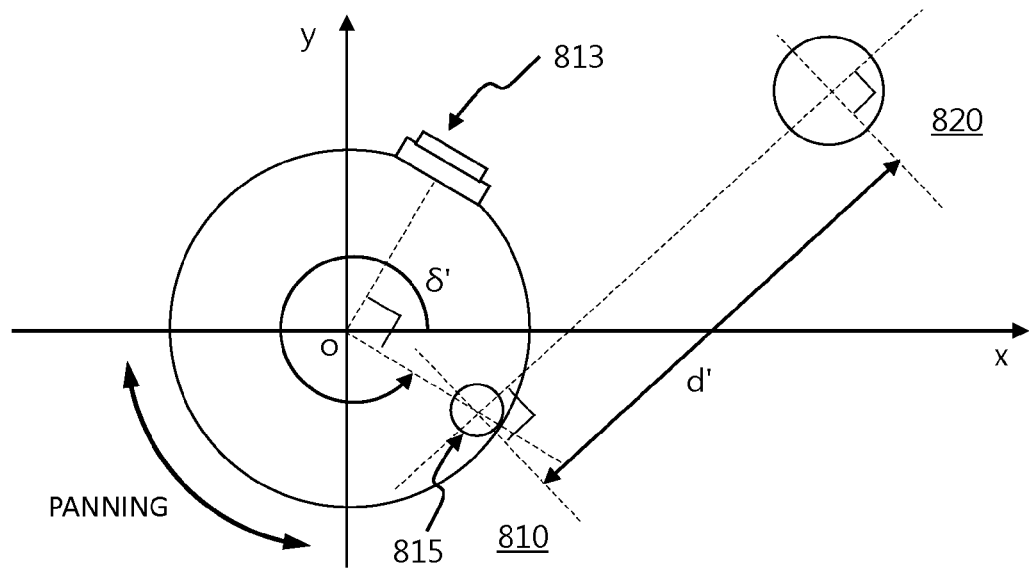
[Fig. 9]
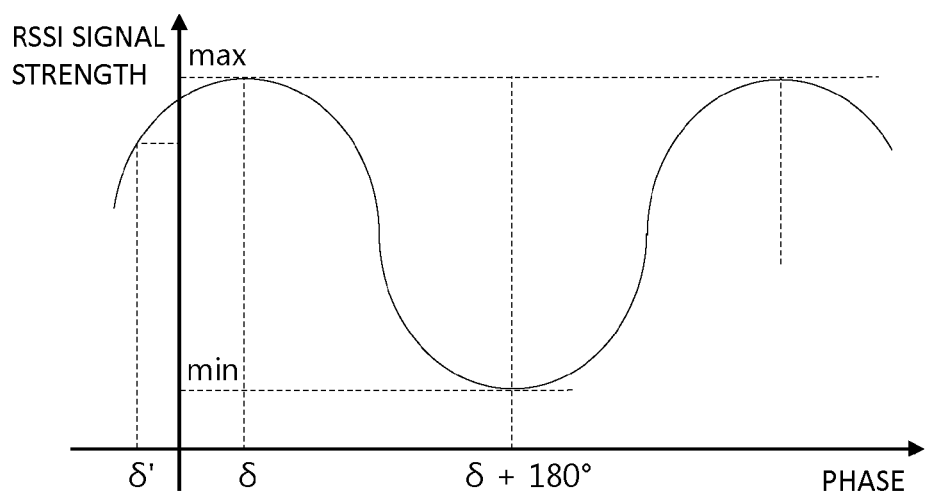

[Fig. 10]
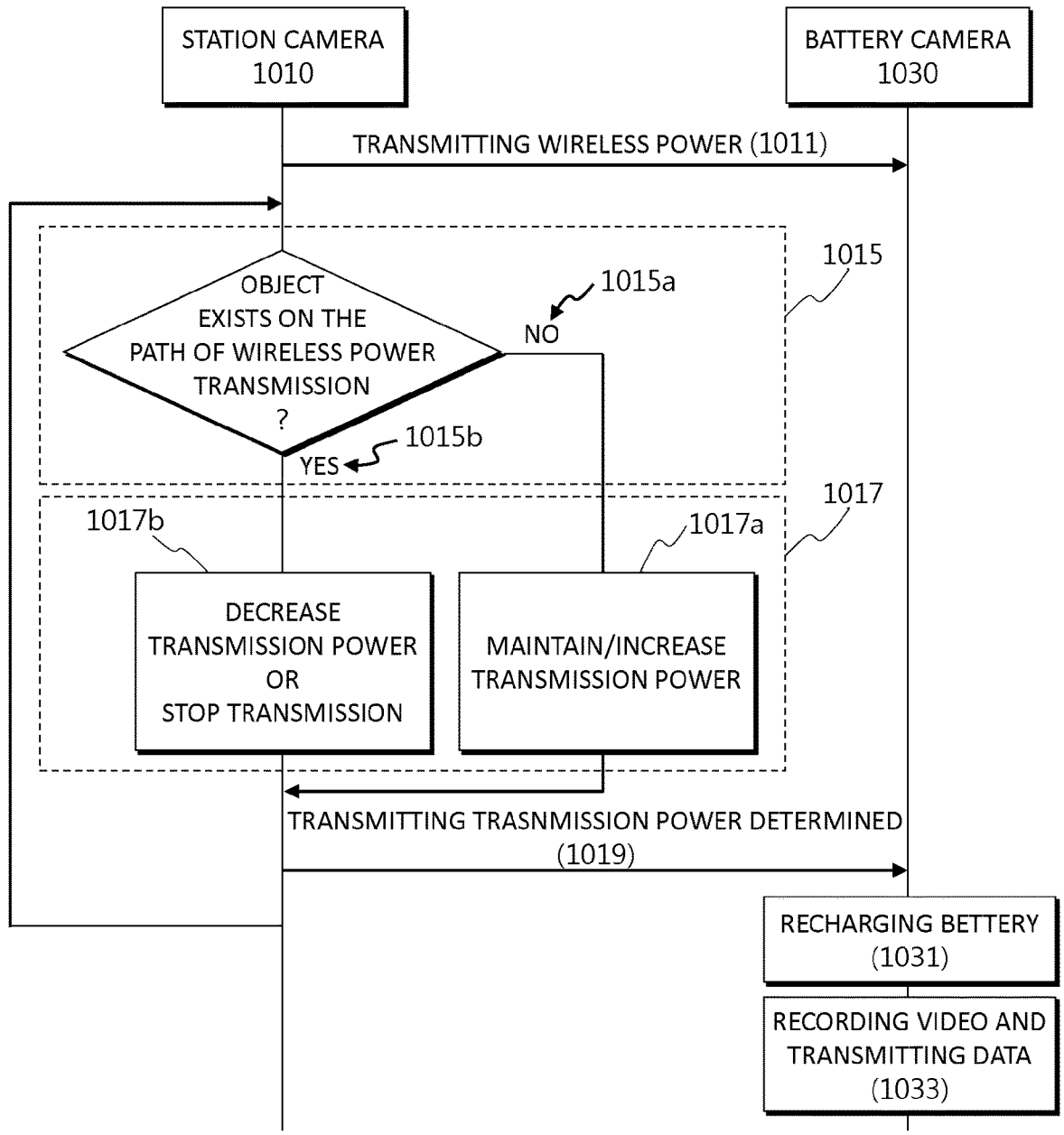

[Fig. 11]
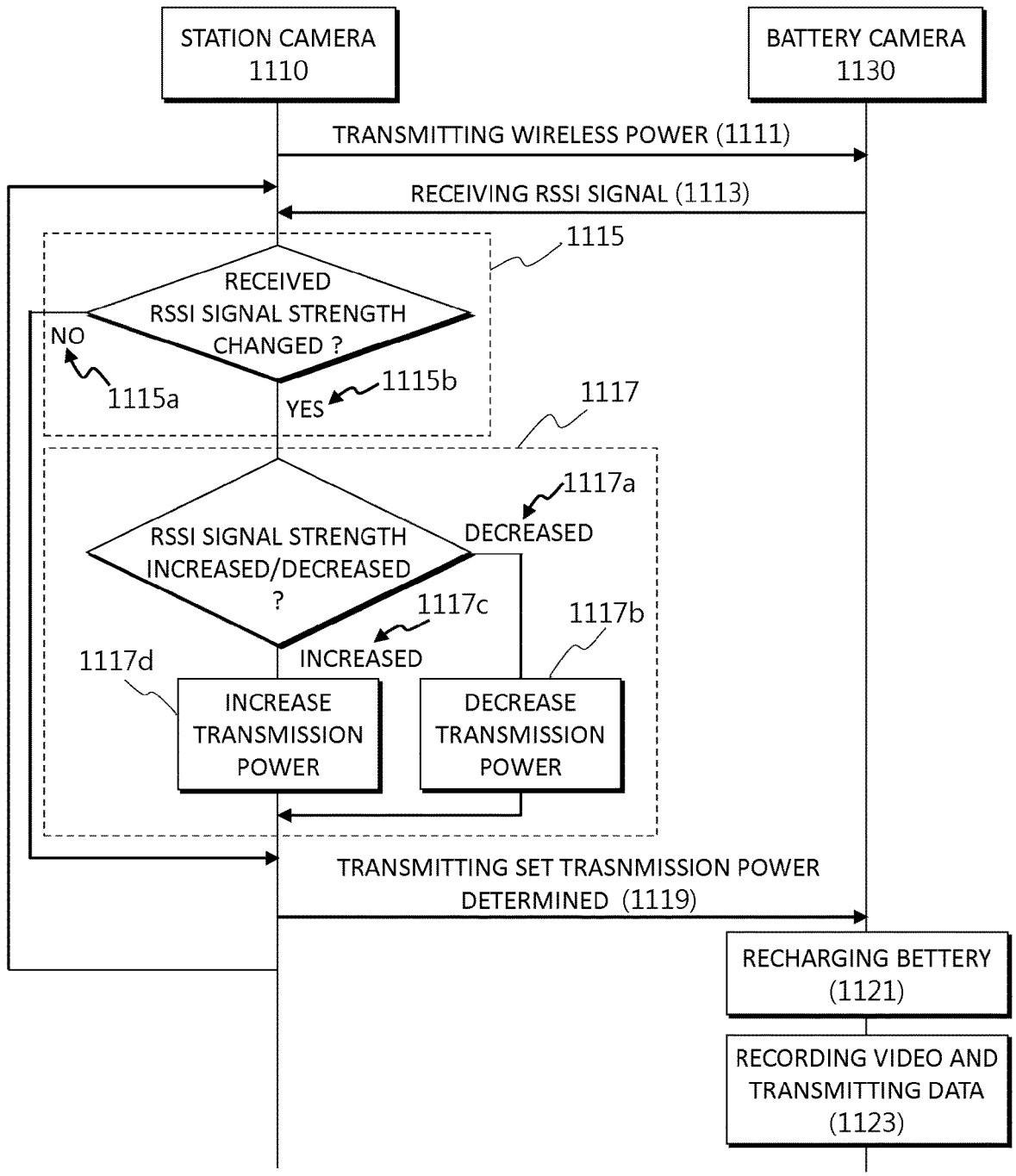

WIRELESS POWER TRANSMISSION OF ELECTRONIC DEVICE HAVING ROTATING BODY

CROSS-REFERENCE TO RELATED APPLICATIONS

This application is a national stage application, filed under 35 U.S.C § 371, of international patent application number PCT/IB2018/059723, filed on Dec. 6, 2018, which is hereby incorporated by reference in its entirety. In addition, this application claims priority from Korean application number 10-2017-0167081, filed on Dec. 6, 2017, which are hereby incorporated by reference in their entirety.

BACKGROUND

Wireless power transmission has been adopted recently as a power supply for electronic devices. The wireless power transmission method can solve the problem of wiring power lines by contactless or wireless power transmission towards power receiving devices, but safety issues on human beings by the wireless power signal should be attended when deploying such devices.

In particular, there is a tendency that a plurality of network cameras are deployed at a certain site to effectively monitor a target area, thereby power lines are also required in such environments as well as network lines for the data exchange between camera devices.

SUMMARY

A surveillance camera system with rechargeable batteries may use wireless power charging technology to periodically charge the batteries in camera devices. However, magnetic induction technology is hard to apply for the camera device remotely deployed in relatively long distances, and other technologies that can be applied to mid-range distance charging such as wireless power transmission based on magnetic resonance or electromagnetic wave are required to consider safety issues on human being.

According to an aspect of the inventive concept, there is provided a camera device, comprising: a camera sensor configured to capture an image of target area; a wireless communicator configured to receive a wireless communication signal from an external device; a rotating body configured to be rotated together with the camera sensor and the wireless communicator; a rotation driver configured to rotate the rotating body; a wireless power transmitter configured to transfer wireless powers to the external device; and a control module configured to: rotate the rotating body in a panning direction by the rotation driver; estimate direction information of the external device at least partially based on a change of a received signal strength of a wireless communication signal caused by the rotation of the rotating body; determine a transmission direction of a wireless power signal for the external device based on the direction information of the external device; and transmit the wireless power signal in the transmission direction.

According to another aspect of the inventive concept, there is provided a method for an electronic device to transmit a wireless power, the method comprising: rotating a rotating body in a panning direction; estimating direction information of the external device at least partially based on a change of a received signal strength of a wireless communication signal caused by the rotation of the rotating body, wherein the wireless communication signal being received from an external device through a wireless communicator, and the wireless communicator being configured to be rotated together with the rotating body; and transmitting a wireless power signal for the external device in a transmission direction, the transmission direction being determined based on the direction information of the external nal device.

According to embodiments described herein, a surveillance camera with batteries may be charged using wirelessly transmitted power, so a usability of the surveillance camera system is improved.

Also, according to embodiments described herein, a surveillance camera may adjust a transmission power for wireless power transfer in response to detecting objects so that the wireless power can be transferred with more efficiencies.

Also, according to embodiments described herein, when a surveillance camera system uses a mid-range wireless power transmission technology, devices may detect human beings in the middle of wireless power transfer so that the safety issue for the humans may be reduced.

Also, according to embodiments described herein, devices may use a plurality of objection detection technologies to detect objects on the path of wireless power transmission, thereby an efficiency of power transfer or safety may be improved.

BRIEF DESCRIPTION OF THE DRAWINGS

FIG. 9 shows a change in the RSSI signal strength according to the rotation angle of the station camera when the station camera is rotated in panning direction.

FIG. 10 illustrates a flowchart illustrating in detail a method for adjusting the transmission power of the wireless power according to the object detection result.

FIG. 11 illustrates a flowchart of a method for an exemplary station camera to monitor the RSSI signal and adjust the transmission power of the wireless power signal transmitted to the battery camera.

DETAILED DESCRIPTION

Figure 1:
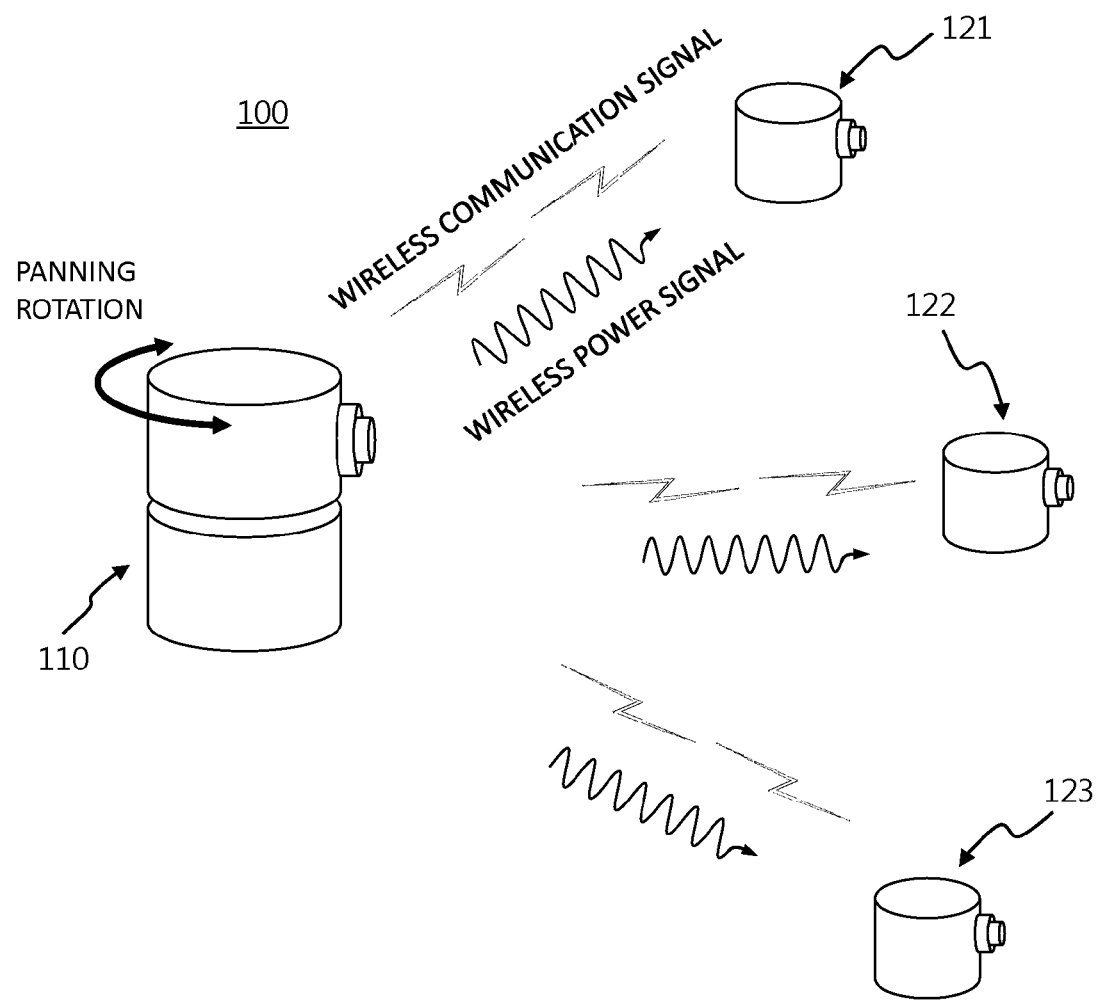
FIG. 1 illustrates an exemplary surveillance camera system that supports wireless power transmissions.

The technologies of the present disclosure can be applied to a surveillance camera system, but not limited thereto. The technologies of the present disclosure can be applied to any electronic device and system that the technical idea of the present disclosure may be applied to.

It should be noted that the technical terms used in the present disclosure are used only to describe specific embodiments and are not intended to limit the technical idea disclosed in the present disclosure. In addition, unless otherwise defined in the present disclosure, the technical terms used in the present disclosure should be construed in a sense that is generally understood by those having ordinary skill in the art to which the technology disclosed in the present disclosure belongs, and should not be construed in an excessively broad sense, or in an excessively narrow sense. In addition, when the technical term used in the present disclosure is a misleading technical term that does not accurately describe the technical idea disclosed in the present disclosure, the technical term should be understood to be replaced by technical term that can be understood by those having ordinary skill in the art to which the technology disclosed in the present disclosure belongs. In addition, the general terms used in the present disclosure should be construed in accordance with the predefined or prior context, and should not be construed in an excessively narrow sense.

As used in the present disclosure, terms including an ordinal number, such as first, second, or the like may be used to describe various configuration elements, but the configuration elements should not be limited by the terms. The terms are used only for the purpose of distinguishing one configuration element from another configuration element. For example, a first configuration element may be referred to as a second configuration element without departing from the scope of the present disclosure, and similarly, the second configuration element may also be referred to as the first configuration element.

Hereinafter, embodiments of the present disclosure will be described with reference to the accompanying drawings in more detail, and the same or similar elements are denoted by the same reference numerals or symbols regardless of the reference numerals or symbols, and redundant description thereof will be omitted.

In addition, in the following description of the present disclosure, when it is determined that detailed description of the related known technology can obscure the gist of the technology disclosed in the present disclosure, the detailed description thereof will be omitted. In addition, it should be noted that the attached drawings are only for easy understanding of concept of the technology disclosed in the present disclosure, and the technical idea should not be construed as limited by the appended drawings.

FIG. 1 illustrates an exemplary surveillance camera system that supports wireless power transmissions. The surveillance camera system may comprise one or more camera devices that function as a transmitter of wireless power and one or more camera devices that function as a receiver. The types of the transmitter and receiver are not limited to camera device, but can be any of electronic devices that the inventive concept described herein can be applied to.

FIG. 1 illustrates a surveillance camera system 100 comprising a wireless power transmission camera 110 and one or more wireless power receiving cameras 121, 122 and 123. The surveillance camera system 100 may be referred to as a network camera system or closed-circuit television (CCTV). The number of the wireless power receiving cameras shown in FIG. 1 is illustrative, but not limited thereto. The wireless power transmission camera 110 may be referred to as, for example, a station camera, and the wireless power receiving camera 121, 122, 123 may be referred to as, for example, a battery camera. The station camera and the battery camera may be a camera including a lens and an image sensor. The lens may be a group of lenses composed of one or more lenses. The image sensor can convert the image input by the lens into an electrical signal. For example, the image sensor may be a semiconductor device capable of converting an optical signal into an electrical signal (hereinafter referred to as an image) such as a charge-coupled device (CCD) or a complementary metal oxide semiconductor (CMOS). The station camera and the battery camera may be cameras that provide RGB or IR images of a target area to be captured.

The station camera 110 may be able to transmit wireless power signals to one or more battery cameras, therefore the station camera 110 may be configured to be supplied by a large capacity power source or an external constant power source. The battery cameras 121, 122 and 123 are devices for converting wireless power signals received from the station camera 110 and storing them. The battery cameras 121, 122 and 123 may include rechargeable battery that can store the electric powers. For example, the rechargeable batteries that can be equipped in the battery cameras 121, 122 and 123 may include a nickel-cadmium battery, a nickel-metal hybrid battery, a lithium-ion battery, a lithium polymer battery, a lead-acid battery, a lithium-iron-phosphate battery, a super capacitor, and so on. Also, according to an embodiment described herein, the battery camera may be also configured to comprise a portion of the features of the station camera so that the battery camera can also enable retransmission of wireless power to another battery camera.

The station camera 110 and the battery cameras 121, 122, and 123 can exchange data with each other through a wireless communication signal. Data that can be included in the wireless communication signal between the cameras may include video/audio data, device identification information, device authentication information, device operational status information, battery charging status information, device control signals, and so on. Also, the data can include all data required for the surveillance camera system other than the information and signals listed above. The wireless communication signal used by the battery cameras 121, 122, and 123 to transmit data may be, for example, a Bluetooth Low-Energy beacon signal.

The wireless communication signal may be transmitted/received through a wireless network established between the station camera 110 and the battery cameras 121, 122 and 123. The wireless network may be a Global System for Mobile communication (GSM), a general packet radio network (GPRS), a wireless wide area network (WWAN), a cellular network, a Bluetooth, a wireless fidelity (Wi-Fi) May be a Near Field Communication (NFC), a Wireless Broadband Internet, a Wibro, an Ultra-Wide Band Communication, a Sub-1G, a ZigBee, a LoRa, a combination thereof, but not limited thereto.

Also, the station camera 110 may include a second network device in addition to the device for the wireless network set up between the battery cameras 121, 122, and 123. The station camera 110 can communicate with an external surveillance camera server or the like through the second network device. In addition to the above-described devices for a wireless network, the second network device may be a wide area network (WAN), a metropolitan area network (MAN), a local area network (LAN), a public switched telephone network (PSTN), a personal area network (PAN), a combination of these wired networks, or any other network, but are not limited to.

The station camera 110 and the battery cameras 121, 122 and 123 may have a PTZ function. Therefore, they can be rotated in a panning direction or the horizontal direction through the operation of a panning driver, and may be vertically moved through the operation of a tilting driver, and the image of the surveillance target area or the subject can be freely captured by zooming in or zooming out the surveillance target area or the subject through the operation of the zooming driver.

The station camera 110 can estimate positions of the battery cameras 121, 122, and 123 using wireless communication signals received from the battery cameras 121, 122, and 123 while panning in a horizontal direction or, in other words, being rotated in a panning direction.

The station camera 110 may store the positions of the battery cameras 121, 122, and 123 after the positions of the battery cameras 121, 122, and 123 are determined through the analysis of the wireless communication signal and the panning rotation. Afterwards, even if the positions of the battery cameras 121, 122, and 123 are changed. the station camera 110 may periodically detect the positions of the battery cameras 121, 122, and 123 by a user command or periodically in a predetermined period of time, and the position information can be updated.

The station camera 110 may transmit the wireless power to the battery cameras 121, 122 and 123, and charge the rechargeable batteries included in the battery cameras 121, 122 and 123.

Wireless power transmission technologies that can be adopted to charge a rechargeable battery in the battery cameras 121, 122, and 123 may use magnetic inductions, magnetic resonances or electromagnetic waves.

First, the magnetic induction type uses the magnetic induction phenomenon between the first and second coils of the transformer. However, when the center of the transmission coil and the reception coil does not match precisely, the electronic power is not transmitted or the transmission efficiency is greatly reduced. Furthermore, the magnetic induction type wireless charging system can be used only when the distance between the wireless power transmitter and the wireless power receiver is short such as within a few millimeters.

Second, the magnetic resonances type uses the phenomenon of resonance between the transmitting and receiving antennas by using a frequency band of several MHz to several tens of MHz. In this type, power is transmitted by using the transmitting and receiving resonant coils, and the wireless power can be transmitted over a distance as compared with the magnetic induction type.

Third, the electromagnetic wave type transmits electronic power directly in the form of electromagnetic waves through the transmitting/receiving antenna. The electromagnetic wave transmission type enables transmission of wireless power over long distances. However, in order to transmit electric power at a level required for operation of the electronic device, the transmission output must increase. Therefore, it is necessary to solve the harmfulness problem of the human body by electromagnetic waves.

In addition to the above three types of wireless power transmission schemes, a high-power laser-based wireless power transmission scheme also can be used as a wireless power transmission scheme. In the wireless power transmission type used in this specification, any of wireless power transmission methods other than the above four schemes may be used.

The surveillance camera captures an object to be monitored at all times and a place to be monitored, and transmits necessary video and event information to the user. Since the surveillance cameras must be able to recording video at all times, the surveillance cameras are required to be used only where there is a power supply that can always supply power.

A surveillance camera with a battery is good in portability and mobility, but the battery needs to be replaced frequently due to limitations of the battery capacity, or the user should periodically charge the rechargeable battery.

When the consumed battery is not replaced, it is impossible to take a picture of the surveillance area or the surveillance target, so that it may not be possible to monitor and prevent accidents.

In the case of a surveillance camera equipped with a battery, the surveillance camera using a commercial battery may have a short usage time of several days to several weeks. If the battery is frequently replaced, the user's discomfort increases, and the cost of the battery increases.

The station camera 110 analyzes the information of the battery charging state included in the wireless communication signal received from the battery camera, and transmits wireless power to the battery camera when it is determined that the battery requires charging.

Each of the wireless power transmission technologies disclosed herein may be used alone, or two or more of them may be used in combination.

The wireless power transmission system disclosed in this specification may convert a general power to a wireless power signal according to a control signal of a controller and transmit the wireless power signal. The wireless power signal may transmit data by modulating and demodulating a transmission signal in addition to a power signal. Therefore, the wireless communication between the station camera and the battery camera is also possible as a communication channel for wireless power transmission.

Hereinafter, a surveillance camera system supporting wireless charging will be described in detail with reference to FIG. For convenience of explanation only, the surveillance camera system will be described as being composed of one station camera 110 and one battery camera 120 respectively.

Figure 2:
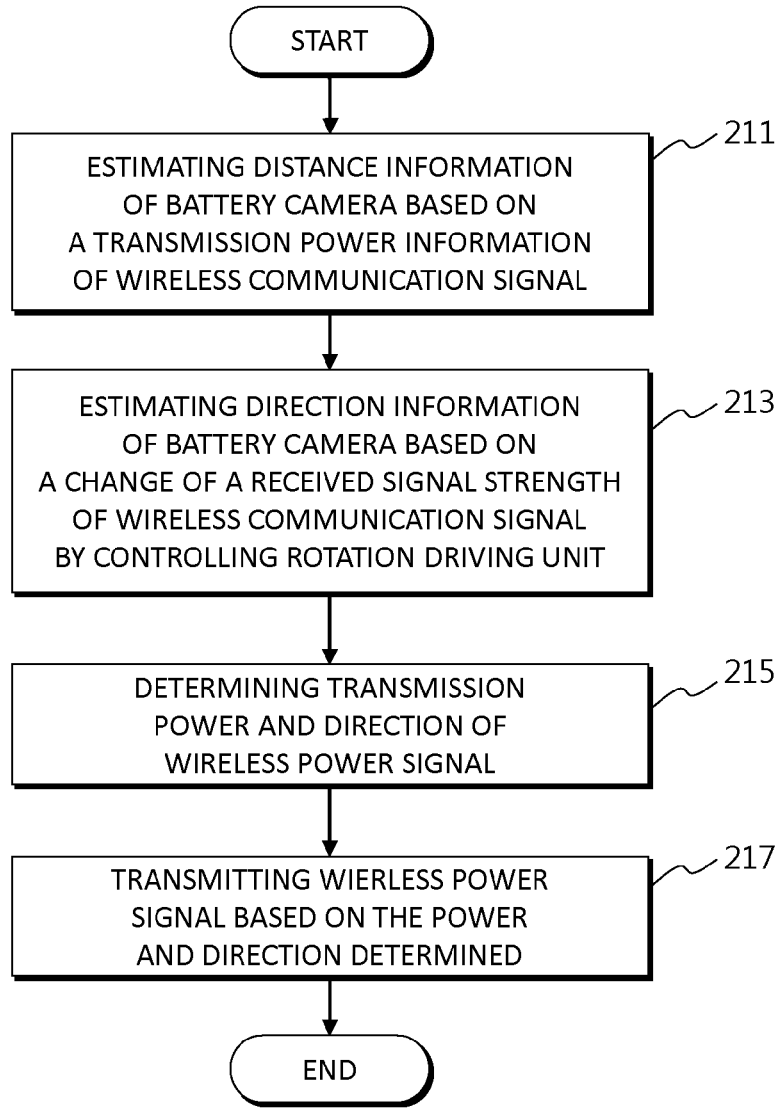
FIG. 2 illustrates a flow chart for a wireless power transmission of an exemplary camera device.

FIG. 2 illustrates a flow chart for a wireless power transmission of an exemplary camera device. Referring to FIG. 2, a method of a station camera to transmit a wireless power to a battery camera will be described.

The station camera may receive a wireless communication signal from the battery camera, and may estimate distance information of the battery camera at least partially based on a strength of the received wireless communication signal (in step 211).

The distance information of the battery camera may be estimated at least partially based on the received signal strength of the wireless communication signal measured by the station camera and the transmission power information on the side of wireless communication signal sender, the transmission power information being included in the wireless communication signal.

The station camera may estimate direction information of the battery camera at least partially based on a change of a received signal strength of a wireless communication signal, which is caused by the rotation of the camera module (in step 215).

In an embodiment, the camera module may include a camera sensor and a wireless communication sensor, while the station camera rotates the camera module in a panning direction. the received signal strength of the wireless communication may be varied during the panning cycle of the camera module because the wireless communication sensor is rotated together with the camera sensor. Therefore, the station camera may measure the received signal strength of the wireless communication signal during the panning cycle of the camera module. In such a way, the station camera may indicate a direction corresponding to a rotation angle at which the received signal strength of the wireless communication signal reaches a specified value (e.g. a maximal value during the cycle) while the rotating body is being rotated in the panning direction, and may used the indicated direction as the direction of the battery camera.

The station camera may determine a transmission power and direction information of the wireless power signal to be transmitted to the battery camera based on the distance information and the direction information of the battery camera (in step 215).

The station camera may transmit the wireless power signal to the battery camera in the direction determined at the transmission power determined (in step 217).

Meanwhile, an electronic device such as a station camera may be configured to include a rotating body according to embodiments in the present document, and the station camera may transmit a wireless power signal to an external device such as a battery device in a similar way described with reference to FIG. 2.

In this embodiment, the electronic device may use direction information of the external device to transmit the wireless power, and the direction information may be derived based on the received signal strength of the wireless communication signal.

Specifically, the electronic device may rotate a rotating body in a panning direction. The electronic device is configured to include a wireless communicator being configured to be rotated together with the rotating body. The electronic device may estimate direction information of the external device at least partially based on a change of a received signal strength of a wireless communication signal caused by the rotation of the rotating body. The wireless communication signal is received from an external device through a wireless communicator, and the wireless communicator is configured to be rotated together with the rotating body. The electronic device may determine a transmission direction of a wireless power signal for the external device based on the direction information of the external device, and may transmit the wireless power signal in the transmission direction.

Hereinafter, referring to FIG. 3, an exemplary method for determining whether an object (obstacle) exists in the wireless power transmission direction, and adjusting the transmission power of a wireless power signal transmitted to the battery camera according to a determination result will be described.

Figure 3:
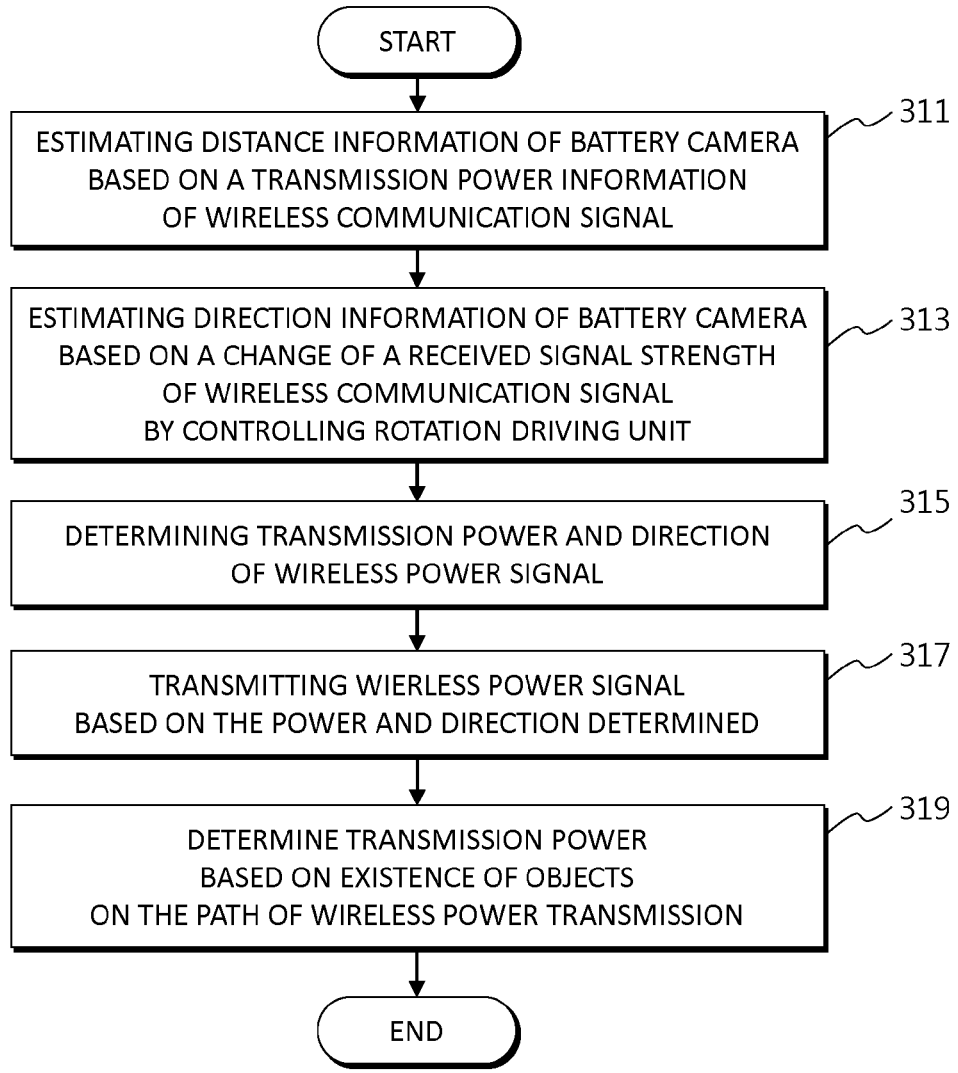
FIG. 3 illustrates a flow chart for adjusting a transmission power of a wireless power signal based on whether an object exists on the path of the power transmission from the station camera to the battery camera in addition to the methods described referring to FIG. 2.

FIG. 3 illustrates a flow chart for adjusting a transmission power of a wireless power signal based on whether an object exists on the path of the power transmission from the station camera to the battery camera in addition to the methods described referring to FIG. 2.

In the following description referring to FIG. 3 to FIG. 6, similar steps related to transmitting the power signal to the battery camera based on the direction information and distance information of the battery camera, which was described referring to FIG. 2, will be repeated in the steps 311 to 317, 411 to 417, 511 to 517, and 611 to 617, and therefore redundant descriptions thereon will be omitted.

The station camera may analyze a presence of an object on the wireless power transmission path from the station camera to the battery camera while transmitting the wireless power signal to the battery camera (in step 317), and the station camera may adjust the strength of the power transmission signal based on the analysis result (in step 319).

Specifically, the station camera may decrease or simply stop the transmission power of the wireless power signal for the battery camera if the analysis result shows that an object or an obstacle exists on the path of the wireless power signal to the battery device. The object may be human, animal, car, vehicle, etc.

On the other hand, the station camera may increase the transmission power of the wireless power signal transmitted to the battery camera if it is determined that there is no object on the path of the power transmission based on the analysis result.

Hereinafter, an exemplary method for determining whether an object (obstacle) exists in the wireless power transmission direction (path) is described. For examples, it may be determined at least partially based on the received signal strength, an analysis on images of surveillance target area, active hours of camera or audio analysis on the surveillance target area, and the transmission power of the wireless power signal will be adjusted according to the determination result, which will be described with reference to FIGS. 4 to 6.

Figure 4:
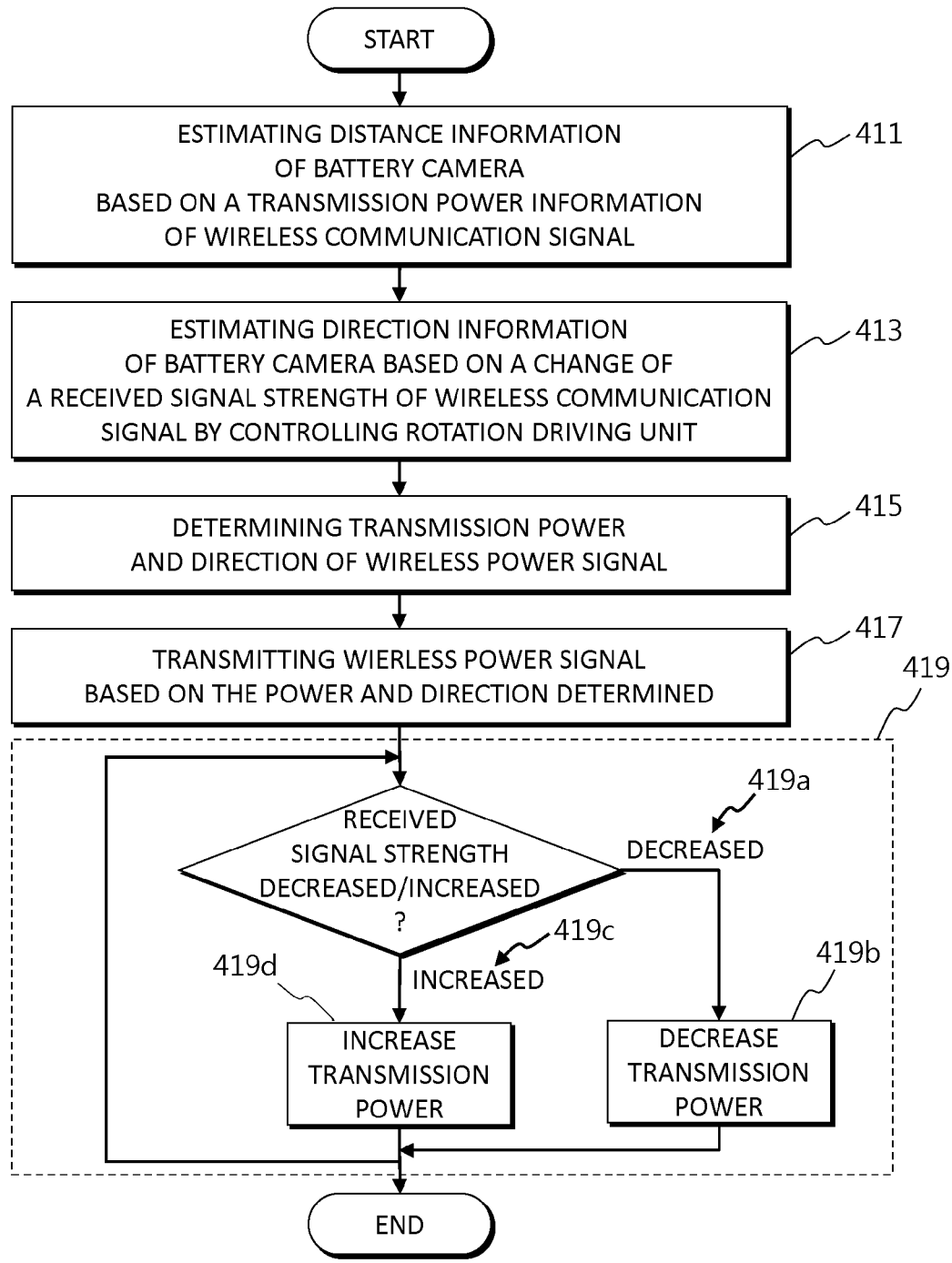
FIG. 4 illustrates a flowchart for adjusting a transmission power based on a received signal strength.

FIG. 4 illustrates a flowchart for adjusting a transmission power based on a received signal strength.

While the wireless power signal is transmitted to the battery camera (in step 417), the station camera may analyze the received signal strength from the battery camera, and may adjust the transmission power of the wireless power signal based on the analysis result (in step 419).

If the strength the wireless communication signal received from the battery camera is decreased while the station camera transmits the wireless power signal to the battery camera (in step 419a), the station camera may determine that there is an object on the path of the power transmission. In such case, the station camera decreases the transmission power of the wireless power signal transmitted to the battery camera compared to the current power (in step 419b), or may stop the transmission of the wireless power signal.

If the received signal strength is increased (in step 419c), the station camera may determine that the object disappeared from the path, and may increase the transmission power of the wireless power signal compared to the current value (in step 419d).

The station camera may detect an object on the path of the power transmission while monitoring the received signal strength.

Figure 5:
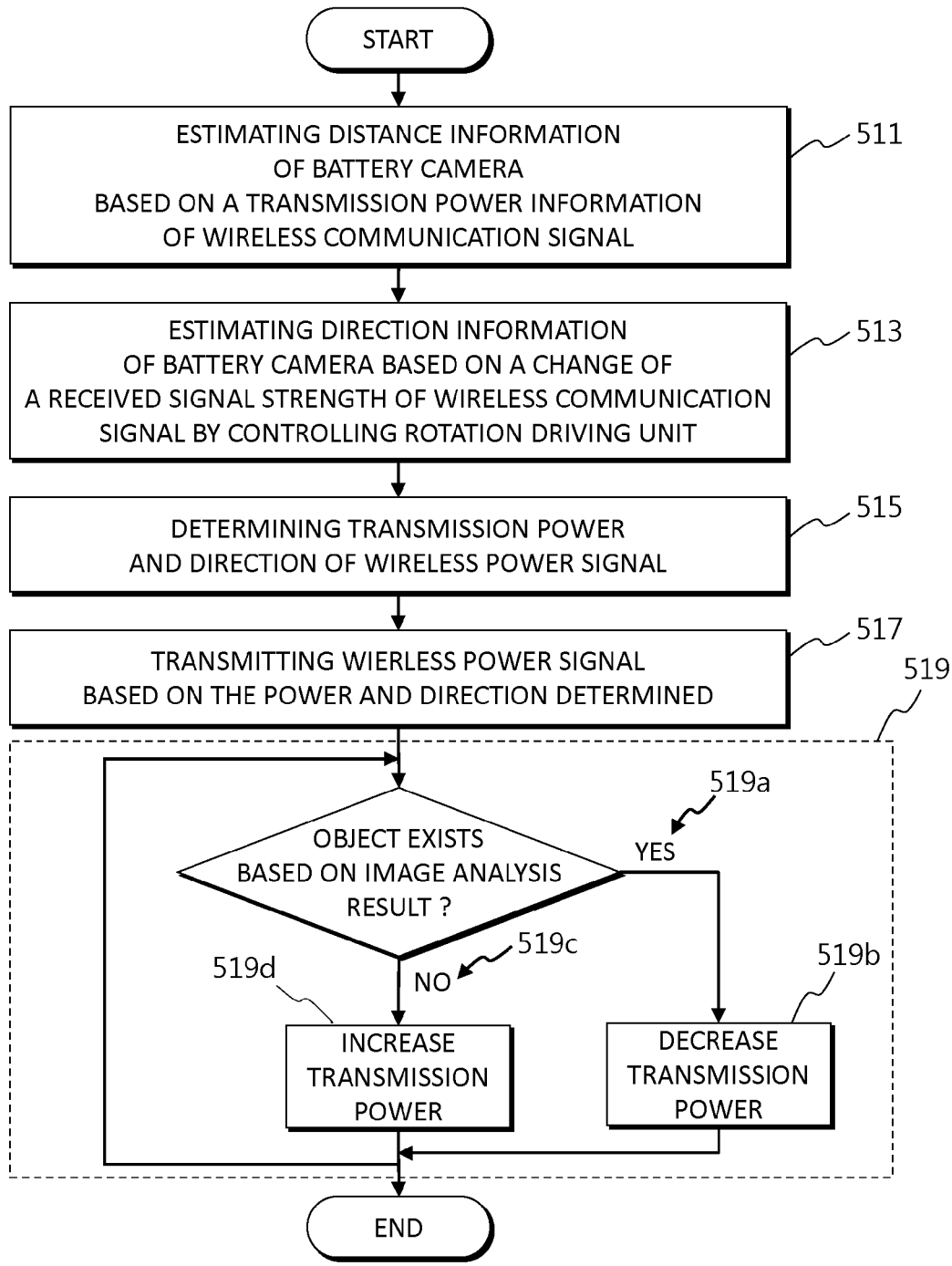
FIG. 5 illustrates a flowchart for adjusting a transmission power based on image analysis.

FIG. 5 illustrates a flowchart for adjusting a transmission power based on image analysis.

While the wireless power signal is transmitted to the battery camera (in step 517), the station camera may analyze an image captured by the camera module or an image captured by a camera module of the battery camera, determine whether an object exists on the path of the power transmission to the battery camera, and may adjust the transmission power of the wireless power signal based on the analysis result (in step 519).

If the station camera determines that there is an object on the path of the power transmission based on the image analysis (in step 519a). the station camera may decrease the transmission power of the wireless power signal transmitted to the battery camera compared to the current power (in step 519b). If the station camera determines that there is no object on the path of the power transmission based on the image analysis (in step 519c). the station camera may increase the transmission power of the wireless power signal transmitted to the battery camera compared to the current power (in step 519d).

The station camera may detect an object on the path of the power transmission while analyzing the image analysis on the target area.

In one embodiment, the station may rotate the camera module in the panning direction so that the field of view of the camera module may fit to the point where the battery camera is deployed, and capture the image through the camera sensor for the image analysis.

Figure 6:
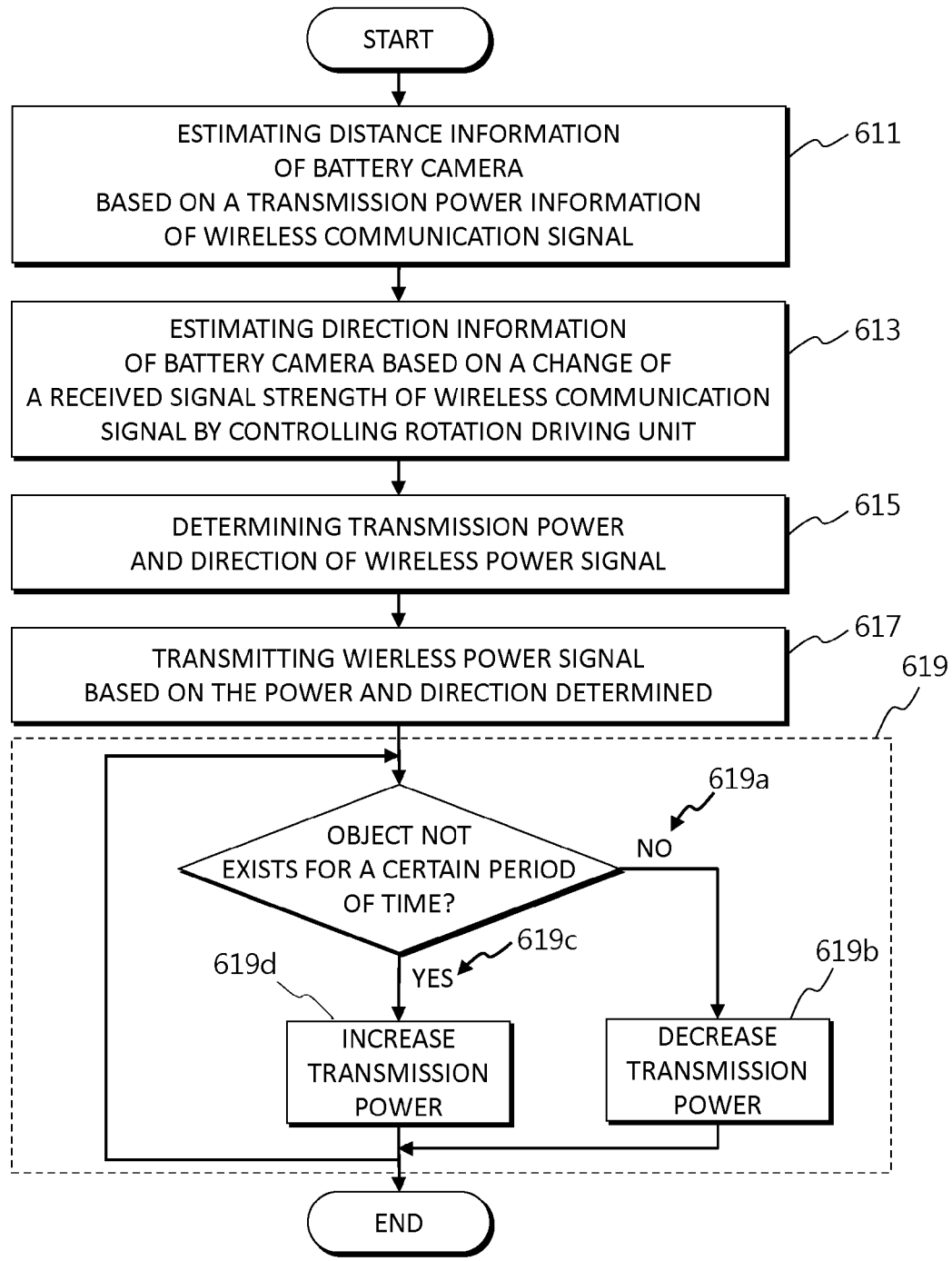
FIG. 6 illustrates a flowchart for adjusting a transmission power based on the time.

FIG. 6 illustrates a flowchart for adjusting a transmission power based on the time.

While the wireless power signal is transmitted to the battery camera (in step 617), the station camera may analyze an image captured by the camera module, and determine whether an object does not exist in the target area of the camera module, and may adjust the transmission power of the wireless power signal based on the analysis result (in step 619).

If the station camera determines that there is no object in the target area of the camera module for a specified period of time (in step 619c). the station camera may increase the transmission power of the wireless power signal transmitted to the battery camera compared to the current power (in step 619d). If the station camera determines that there is an object in the target area of the camera module for a specified period of time (in step a19a). the station camera may increase the transmission power of the wireless power signal transmitted to the battery camera compared to the current power (in step 619d).

The absence of the object for the certain period of time is determined at least partially based on whether it corresponds to the night time period set by schedulers, whether the sound around the target area has not occurred for a certain period of time according to a sound analysis result, or whether it corresponds to an off time.

Figure 7:
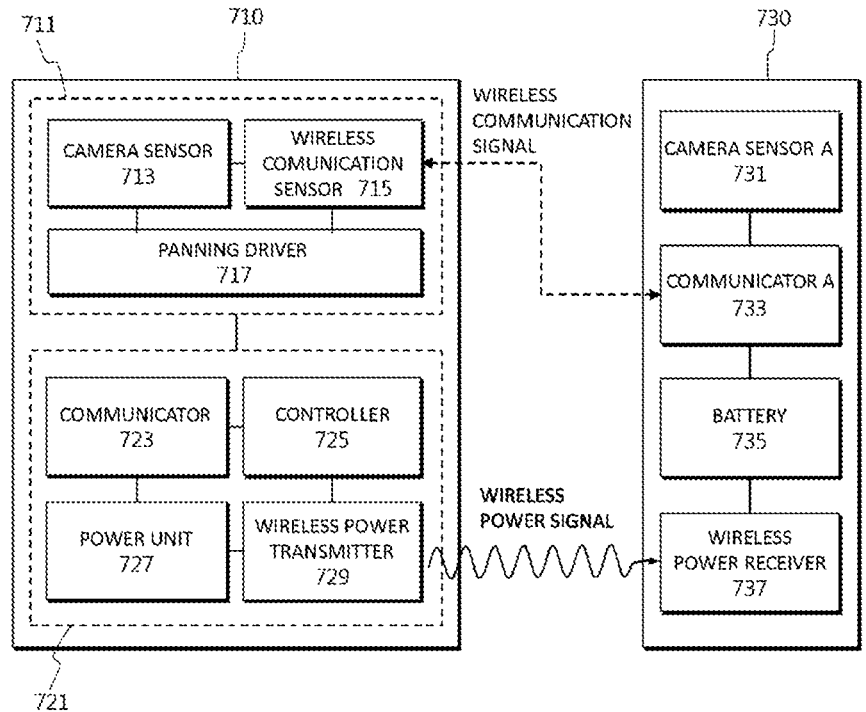
FIG. 7 shows a block diagram of elements of a station camera and a battery camera in an exemplary surveillance camera system.

FIG. 7 shows a block diagram of elements of a station camera and a battery camera in an exemplary surveillance camera system. Referring to FIG. 7, a station camera 710 may be disclosed as an exemplary camera device capable of transmitting wireless power to the battery camera 730.

The station camera 710 comprises a camera module 711 and a control module 721 control module 721. The camera module 711 comprises a camera sensor 713, a wireless communication sensor 715, and a panning driver 717. The control module 721 may comprise a communicator 723, a controller 725, a power unit 727, and a wireless power transmitter 729.

The camera module 711 may be physically separated from the control module 721 but may be electrically connected to the control module 721. The control module 721 may supply power to the camera module 711, and may communicate internally with the camera module 711. The camera module 711 is connected to the control module 721 via the panning driver 717 so that the camera module 711 can be rotated in the panning direction or in a horizontal plane according to commands from the control unit.

The camera sensor 713 may acquire an image of a surveillance target area or an image for analyzing whether an object or a human exists between the station camera 710 and the battery camera 730.

The wireless communication sensor 715 may receive the wireless communication signal from the communicator A 733 in the battery camera 730 and may transmit the wireless communication signal to the controller 725. The wireless communication sensor 715 may be disposed at a portion of the camera module 711 at a distance from the rotation axis that is a reference for the panning operation (a rotation in the panning or horizontal direction) of the camera module 711. Accordingly, when the camera module 711 is rotated in the panning direction, the wireless communication sensor 715 rotates in a circle about the rotation axis, so that the distance to the battery camera 730 decreases and increases during a panning cycle. The rotating angle may be unlimited (e.g. 360 degrees) or limited within a certain range (e.g. less than 340 degrees). Therefore, the controller 725 may determine a direction of the battery camera as an angle at which the wireless communication sensor 715 becomes nearest to the battery camera 730, or the received signal strength from the battery camera 730 is biggest or reaches a predefined value. In some embodiment, the camera module and the wireless communication sensor may be disposed to be rotated together with a rotating body of the station camera.

The wireless communication sensor 715 and the communicator A 733 of the battery camera 730 may be configured as a wireless communication module. For example, the wireless communication sensor 715 and the communicator A 733 may communicate with each other via Bluetooth, WiFi, Near Field Communication (NFC), Wireless Broadband Internet, Wibro, Ultra-Wide Band Communication, Sub-1G, ZigBee, LoRa, and the like.

The station camera 710 may be equipped with a panning function for rotating a part of the apparatus. The panning function may be, for example, a horizontal rotation operation of a camera having a PTZ function. The station camera 710 can effectively photograph a subject using the PTZ function. For example, the station camera 710 can be rotated in a panning or horizontal direction through the operation of a panning driver, and can move in the vertical direction through the operation of a tilting driver. Tilting and zooming of the target area and/or the subject through the operation of the zooming driver, thereby capturing images of the target area and/or the subject.

The panning driver 717 may panning the camera module 711 clockwise or counterclockwise according to a control command of the controller 725. In some embodiment, the panning driver 717 may include a panning motor, and the panning driver 717 may be operated by the panning motor.

Meanwhile, the station camera 710 may include a rotating body having components that rotate together. When the rotating operation is performed by the panning driver 717, the elements disposed on the rotating body rotate together. For example, the station camera 710 may include a rotating body that is rotatable with the camera module 711 and the wireless communication sensor 715. The panning driver or rotation drive unit 717 may control the rotating body to rotate at a predetermined speed, and the rotation body may rotate continuously or periodically.

The communicator 723 can transmit the captured image for surveillance to an external surveillance camera system server or receive a user's control command.

The controller 725 may analyze the position of the battery camera 730 using the wireless communication signal received by the wireless communication sensor, e.g. the beacon signal, and may cause the wireless power transmitter 729 to transmit the wireless power to the battery camera in the position.

The controller 725 can analyze whether there is an object including a person or an animal in the wireless power transmission path inbetween to the battery camera 730, the position of the battery camera is determined based on the beacon signal. If there is an object on the path, the intensity of the wireless power transmitted to the battery camera 730 can be adjusted so as not to damage the object.

The power supply unit 727 may supplies power to all components of the station camera 710 by receiving power from the outside and supplies power to the wireless power transmitter 729 so that the wireless power can be transmitted to the battery camera 730.

The wireless power transmitter 729 receives power from the power supply unit 727 and converts the supplied power into wireless power under the control of the controller 725 and transmits the wireless power to the battery camera 730. The wireless power transmission method between the wireless power transmitter 729 and the wireless power reception unit 737 of the battery camera 730 may include a magnetic induction, an electromagnetic wave, and a magnetic resonance, but not limited thereto.

In order to transmit a wireless power signal in a direction in which the plurality of battery cameras 730 are scattered in the target, the wireless power transmitter 729 wirelessly transmits wireless power, and the direction for the power transmission can be changed by a control command of the controller 725.

In addition, the wireless power transmitter 729 may include a plurality of directional antennas for transmission of a wireless power signal. The wireless power transmitter 729 may include a directional antenna capable of transmitting a wireless power signal in a specific direction by a control command of the controller 725, and a wireless power signal can be transmitted via the selected directional antenna.

The battery camera 730 may include a camera sensor A 731, a communicator A 733, a battery 735, and a wireless power receiving unit 737.

The camera sensor A 731 can capture an image of a target area or an object to be monitored.

The communicator A 733 can transmit the surveillance image data captured by the camera sensor A 731 to the station camera 710. Further, the communicator A 733 may be a communicator that transmit data to the station camera 710 including, the data including device identification information, device authentication information, device operation status information, battery charging status information, device control signal, signal strength information measured at the receiving device, transmission power at the sending device, etc.

The beacon signal may include a TxPower (Transmitter Power) signal and an RSSI (Received Signal Strength Indication) signal, and the TxPower signal may be signal strength information of a transmitter, The RSSI signal may be signal strength information measured at the receiving side.

The battery 735 is charged with electric power supplied from the wireless power receiving unit 737 and can supply power to components of the battery camera including the camera sensor A 731 and the communicator A 733.

The wireless power receiving unit 737 receives the wireless power transmitted from the wireless power transmitting unit 729 of the station camera 710 and converts the received wireless power into general power to charge the battery 735 Can be supplied to the circuit.

The station camera 710 may be configured to comprise a camera sensor 713, a wireless communication sensor 715, a rotating body, a rotation drive unit 717, a wireless power transmission unit 729 and a controller 725.

Meanwhile, a station camera 710 may comprise: a camera module 710 configured to capture an image of target area; a wireless communication sensor 715 configured to receive a wireless communication signal from an battery camera 730; a rotating body configured to be rotated together with the camera sensor and the wireless communication unit; a rotation driver 717 configured to rotate the rotating body; a wireless power transmitter 729 configured to transfer wireless powers to the battery camera; and a controller 725 configured to: rotate the rotating body in a panning direction by the rotation driver; estimate direction information of the battery camera at least partially based on a change of a received signal strength of a wireless communication signal caused by the rotation of the rotating body; determine a transmission direction of a wireless power signal for the battery camera based on the direction information of the battery camera; and transmit the wireless power signal in the transmission direction.

Hereinafter, an exemplary method of the controller 725 for calculating the position of the battery camera 730 based on the wireless communication signal received from the battery camera 730 and the panning operation (rotation) of the camera module 711 will be described in detail with reference to FIGS. 8 to 9 and the following equations.

FIG. 8 illustrates a distance change with the battery camera according to the rotation of the wireless communication sensor of the camera module when the exemplary station camera is rotated in a panning direction.

The station camera 810 and the battery camera 820 exchange wireless communication signals with each other and communicate with each other. The wireless communication signal received by the station camera 810 from the battery camera 820 may include a value indicating a transmission power used for transmitting the wireless communication signal at the battery camera 820 side. For example, the wireless communication signal may be a beacon signal as described above, and the beacon signal may include a TxPower (Transmitter Power) value indicating a transmission power. In addition, the station camera 810 can measure a signal strength of a reception side of the wireless communication signal. For example, the station camera 810 can measure a Received Signal Strength Indication (RSSI) value.

The station camera 810 may estimate the distance to the battery camera at least partially based on the transmission power of the battery station and the received signal strength value of the station camera. For example, when D is the distance between the station camera 810 and the battery camera 820, and n is a signal propagation constant value, the following equation 1 is generally satisfied.

$$RSSI = -10*n*Log(D) + TxPower \qquad \text{[Equation 1]}$$

Based on Equation 1, the distance D between the station camera 810 and the battery camera 820 can be calculated as the following equation 2.

$$D = 10^{\wedge}((TxPower - RSSI)/(10*n)) \qquad \text{[Equation 2]}$$

The direction of the battery camera 820 with respect to the station camera 810 is determined by the beacon signal received from the battery camera 820 when the camera module of the station camera 810 or the rotating body disposed therein is rotated in panning direction.

Figure 8A:
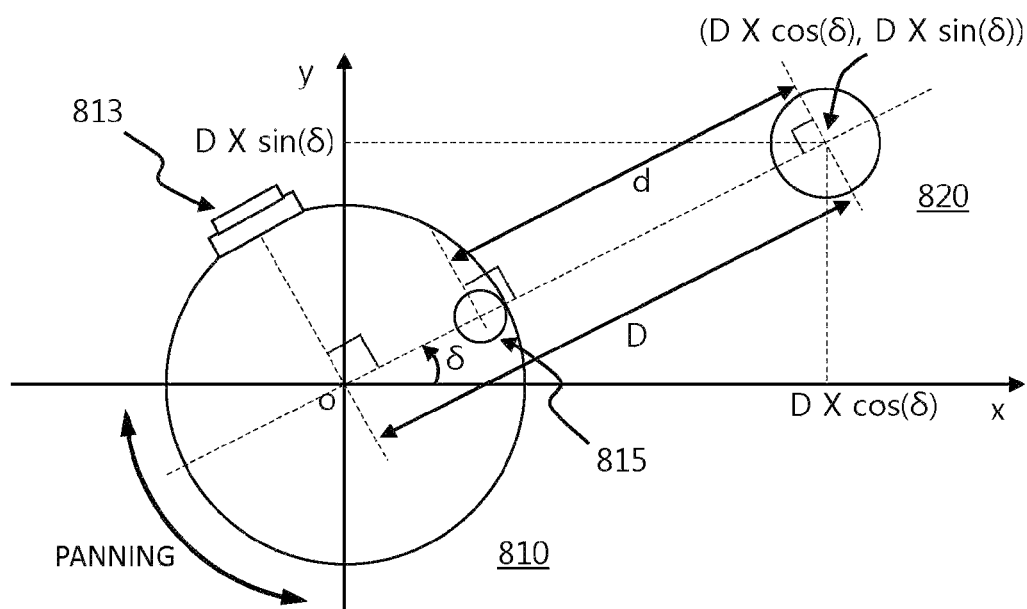
FIG. 8 illustrates a distance change with the battery camera according to the rotation of the wireless communication sensor of the camera module when the exemplary station camera is rotated in a panning direction.

FIGS. 8A and 8B shows views of the station camera 810 and the battery camera 820 from above. When the distance between the wireless communication sensor 815 and the battery camera 820, which are provided to rotate together with the rotating body, is changed when the camera module or the rotating body of the station camera 810 rotates in the panning direction.

In this specification, the camera sensor 813 and the wireless communication sensor 815 of the station camera 810 are in a state in which they are perpendicular to each other with respect to the origin O of the plane coordinate system as a reference for the panning operation (rotational motion). The wireless communication sensor 815 and the camera sensor 813 may be configured to rotate together at a predetermined angle.

FIG. 8A shows a case where the wireless communication sensor 815 has an angle δ' from the reference axis x and the distance from the wireless communication sensor 815 to the battery camera 820 is d'. In FIG. 8B, the wireless communication sensor 813 has an angle δ from the reference axis x, and the distance from the wireless communication sensor 813 to the battery camera 820 indicates d.

The size of the RSSI of the wireless communication signal received by the wireless communication sensor 815 is larger when the distance from the wireless communication sensor 815 to the battery camera 820 is d than when d' because d' is larger than d. Also, the distance between the wireless communication sensor 815 and the battery camera 820 is closest when the distance between the wireless communication sensor 815 and the battery camera 820 is d (case of FIG. 8A).

FIG. 9 shows a change in the RSSI signal strength according to the rotation angle of the station camera when the station camera is rotated in panning direction, and the RSSI signal strength repeats decreasing and increasing with a rotation cycle of 360 degrees.

Therefore, when the wireless communication sensor 815 and the battery camera 820 are closest to each other, and also when the angle δ formed by the wireless communication sensor 815 from the reference axis x and the distance D between the station camera and the battery camera 820 are known, the position of the battery camera 820 (in plane coordinate around the station camera) can be obtained by the following Equation 3 as shown in FIG. 8A. That is, the station camera 810 can acquire distance information and direction information of the battery camera 820.

$$X=D*\cos(\delta)$$

$$Y=D*\sin(\delta) \quad \text{[Equation 3]}$$

The station camera 810 acquires all of the coordinates of the plurality of battery cameras 820 and stores the coordinates of the plurality of battery cameras 820. The station camera 820 periodically scans the battery cameras 820 to store updated position information, the battery camera 820 may be scanned to update the position.

The station camera 810 analyzes the wireless communication signal received from the battery cameras 820 to check the battery charging state of the battery cameras 820, wireless power can be supplied to charge the battery of the battery camera.

At this time, depending on the distance from the station camera 810 to the battery camera 820, the transmission power of the wireless power can be increased if the distance is long, and the transmission power of the wireless power can be decreased if the distance is short.

Referring to FIGS. 10 to 11, an exemplary method of an exemplary surveillance camera system will be described, the method for determining whether an object exists on a transmission path of the wireless power signal and controlling the transmission power of the wireless power signal based on the determination result when distance information and direction information of a battery camera are acquired.

FIG. 10 is a flowchart illustrating in detail a method for adjusting the transmission power of the wireless power according to the object detection result. Referring to FIG. 10, a method for adjusting the transmission power of the wireless power in accordance with an object detection result is disclosed.

First, the station camera 1010 transmits a wireless power signal at a predetermined transmission power using the distance information and direction information of the battery camera 1030 requiring battery charging (in step 1011).

The station camera 1010 detects an object on the wireless power transmission path (in step 1015) and adjusts the transmission power of the wireless power signal according to the object detection result (in step 1017).

That is, if the station camera 1010 determines that no object exists on the wireless power transmission path (in step 1015*a*), the station camera 1010 may transmit the wireless power to the battery camera 1030 maintaining the current transmission power or in an increased transmission power (in step 1017*a*).

If the station camera 1010 determines that an object exists on the wireless power transmission path (in step 1015*b*), the station camera 1010 may decrease the transmission power of the wireless power signal lower than the current level or may set the transmission power to 0 to stop the transmission of the wireless power (in step 1017*b*).

Then, the station camera 1010 transmits a wireless power signal to the battery camera 1030 at the power level adjusted above (in step 1019).

Next, the battery camera 1030 converts the received wireless power signal to charge the battery 1031, captures an image of the target area by operating the camera sensor with the charged battery power, and transmits the wireless communication data including the captured image to the station camera (in step 1033).

In this case, the step 1017*a* indicating the operation of detecting no object on the wireless power transmission path (in step 1015*a*) and transmitting the wireless power signal continuously at the current transmission power (in step 1017*a*) corresponds to the case where the wireless power signal is continuously transmitted at the transmission power level when no object is detected on the wireless power transmission path.

Meanwhile, the step 1017*b* indicating the operation of detecting an object on the wireless power transmission path (in step 1015*b*) and transmitting the wireless power signal at a decreased power level than the current level (in step 1017*b*) corresponds to the case the wireless power is transmitted in the lower power level when an object is detected and the transmission power is increased compared to the before when the object disappears.

The station camera 100 determines the presence or absence of an object on the transmission path of the wireless power signal based on an analysis on the operation time of the station camera, an image and sound analysis of the surveillance target area, a change of the received signal strength, and combinations of one or more of these.

Hereinafter, referring to FIG. 11, an exemplary method for detecting an object on a wireless power transmission path according to the received signal strength of a wireless communication signal received from a battery camera in an exemplary surveillance camera system, and controlling the transmission power of a wireless power signal transmitted to the battery camera according to a detection result will be described in detail.

FIG. 11 is a flowchart of a method for an exemplary station camera to monitor the RSSI signal and adjust the transmission power of the wireless power signal transmitted to the battery camera. Referring to FIG. 11, a method for detecting an object on a wireless power transmission path by monitoring an RSSI signal is disclosed.

First, the station camera 1110 transmits a wireless power signal in a predetermined transmission power level to the battery camera 1130 of which location is known (in step 1111).

Next, the station camera 1110 receives a beacon signal from the battery camera 1130 and measures a RSSI value (in step 1113), and monitors the RSSI value by measuring the changes of the RSSI to determine whether or not an object exists (in step 1115).

The station camera 1110 sets the transmission power of the wireless power signal according to the result of monitoring the change of the RSSI value (in step 1117) and transmits the wireless power signal to the battery camera 1130 in the power level set currently (in step 1119).

Next, the battery camera 1130 converts the received wireless power to charge the battery (in step 1121), operates the camera sensor with the charged battery power, captures an image of the target area, and transmits the wireless communication data to the station camera (in step 1123).

The station camera 1110 monitors a change of the RSSI value (a signal strength of the wireless communication signal at the receiver side) of the beacon signal received from the battery camera 1130, and if there is no change in the RSSI (in step 1115*a*), the wireless power signal is continuously transmitted at the current power level (in step 1119), and if there is a change in the RSSI (in step 1115*b*), an operation 1117 is performed to change and set the transmission power level of the wireless power signal.

When the decrease of the RSSI value is detected (in step 1117*a*), the station camera 1110 determines that there is an object on the wireless power transmission path and sets the transmission power of the wireless power signal lower than the current set (in step 1117*b*) or stop wireless power transmission.

Meanwhile, when the increase of the RSSI value is detected (in step 1117*c*), the station camera 1110 determines that the object was removed on the wireless power transmission path and increase the transmission power of the wireless power signal higher than current (in step 1117*d*).

The wireless power transmission and operations of the battery camera 1130 (in steps 1119 to 1123) are the similar to those described above and thus will be omitted.

The wireless power transmission method according to the embodiments disclosed herein can be implemented as computer-readable code on a computer-readable recording medium. A computer-readable recording medium includes all kinds of recording apparatuses in which data that can be read by a computer system is stored. Examples of the computer-readable recording medium include ROM, RAM, CD-ROM, magnetic tape, floppy disk, optical data storage, and the like. In addition, the computer-readable recording medium may be distributed over a network-connected computer system so that computer readable code can be stored and executed in a distributed manner. In addition, functional programs, codes, and code segments for implementing the present invention can be easily deduced by programmers skilled in the art to which the present description belongs.

In the foregoing, preferred embodiments of the present invention have been described with reference to the accompanying drawings. Here, the terms and words used in the present specification and claims should not be construed as limited to ordinary or dictionary terms, and should be construed as meaning and concept consistent with the technical idea of the present invention.

The scope of the present invention is not limited to the embodiments disclosed in this specification, and the present invention can be modified, changed, or improved in various forms within the scope of the present invention and claims.

The invention claimed is:

1. A camera device, comprising:
a camera sensor to capture an image of target area;
a wireless communication sensor to receive a wireless communication signal from an external device;
a rotating body to be rotated together with the camera sensor and the wireless communication sensor;
a rotation driver to rotate the rotating body;
a wireless power transmitter to transfer wireless powers to the external device; and
a controller to:
rotate the rotating body in a panning direction by the rotation driver;
estimate direction information of the external device based on a change of a received signal strength of a wireless communication signal caused by the rotation of the rotating body;
determine a transmission direction of a wireless power signal for the external device based on the direction information of the external device; and
transmit the wireless power signal in the transmission direction.

2. The camera device of claim 1, wherein the controller is further to:
estimate distance information of the external device at least partially based on the received signal strength of the wireless communication signal and transmission power information of the wireless communication signal, the transmission power information being included in the wireless communication signal; and
determine a transmission power of the wireless power signal for the external device at least partially based on the transmission direction of the external device and the distance information of the external device, and
wherein the wireless power signal is transmitted further based on the transmission power.

3. The camera device of claim 1, wherein the controller is to indicate, as the direction of the external device, a direction corresponding to a rotation angle at which the received signal strength of the wireless communication signal reaches a specified value while the rotating body is being rotated in the panning direction.

4. The camera device of claim 1, wherein the controller is further to:
decrease the transmission power of the wireless power signal transmitted to the external device if the received signal strength of the wireless communication signal received from the external device is decreased while the wireless power signal is being transmitted; and
increase the transmission power of the wireless power signal transmitted to the external device if the received signal strength of the wireless communication signal received from the external device is increased while the wireless power signal is being transmitted.

5. The camera device of claim 1, wherein the controller is further to:
determine whether an object exists inbetween to the external device based on an analysis result on the image of the target area captured by the camera sensor; and
if the object is determined to exist, decrease the transmission power of the wireless power signal being transmitted to the external device.

6. A method for an electronic device to transmit a wireless power, the method comprising:
- rotating a rotating body in a panning direction;
- estimating direction information of the external device based on a change of a received signal strength of a wireless communication signal caused by the rotation of the rotating body, wherein the wireless communication signal being received from an external device through a wireless communication sensor, and the wireless communication sensor being rotated together with the rotating body; and
- transmitting a wireless power signal for the external device in a transmission direction, the transmission direction being determined based on the direction information of the external device.

7. The method of claim 6, further comprising:
- estimating distance information of the external device at least partially based on the received signal strength of the wireless communication signal and transmission power information of the wireless communication signal, the transmission power information being included in the wireless communication signal; and
- transmitting the wireless power signal based on a transmission power being determined at least partially based on the transmission direction of the external device and the distance information of the external device.

8. The method of claim 6, wherein the direction information of the external device corresponds to a rotation angle at which the received signal strength of the wireless communication signal reaches a specified value while the rotating body is being rotated in the panning direction.

9. The method of claim 6, further comprising:
- decreasing the transmission power of the wireless power signal transmitted to the external device if the received signal strength of the wireless communication signal received from the external device is decreased while the wireless power signal is being transmitted; and
- increasing the transmission power of the wireless power signal transmitted to the external device if the received signal strength of the wireless communication signal received from the external device is increased while the wireless power signal is being transmitted.

10. The method of claim 6, further comprising:
- determining whether an object exists inbetween to the external device based on an analysis result on the image of the target area captured by a camera sensor; and
- if the object is determined to exist, decreasing the transmission power of the wireless power signal being transmitted to the external device.

11. The method of claim 10, further comprising:
- rotating the camera sensor in a panning direction such that the target area of the camera sensor is directed towards the direction of the external device; and
- acquiring, the camera sensor, the image of the target area for an image analysis.

12. The method of claim 6, further comprising:
- if an object is determined to not exist for a certain period of time within the target area of a camera sensor, increasing a transmission power of the wireless power signal transmitted to the external device,
- wherein the absence of the object for the certain period of time is determined at least partially based on whether it corresponds to the night time period set by schedulers, whether the sound around the target area has not occurred for a certain period of time according to a sound analysis result, or whether it corresponds to an off time.

* * * * *